Dec. 11, 1951 P. F. G. HOLST ET AL 2,577,893
TONE AND VOLUME CONTROL
Filed Dec. 22, 1949 3 Sheets-Sheet 1

Inventors:
Paul F. G. Holst
Morton J. Nelson
By: Alden W. Redfield
Attorney.

Dec. 11, 1951     P. F. G. HOLST ET AL     2,577,893
TONE AND VOLUME CONTROL
Filed Dec. 22, 1949     3 Sheets-Sheet 3

VERY LOUD

LOUD

MEDIUM

SOFT

PLUS

MIDDLE

MINUS

SYMPHONY

SWING

SONG

SPEECH

Inventors:
Paul F. G. Holst
Morton J. Nelson
By: Alden W. Redfield
Attorneys

Patented Dec. 11, 1951

2,577,893

UNITED STATES PATENT OFFICE 2,577,893

TONE AND VOLUME CONTROL

Paul F. G. Holst and Morton J. Nelson, Cincinnati, Ohio, assignors to Avco Manufacturing Corporation, Cincinnati, Ohio, a corporation of Delaware Application December 22, 1949, Serial No. 134,384

23 Claims. (Cl. 178—44)

The present invention relates to volume and tone control, and more particularly, to a push button volume and tone control wherein certain compensating effects are provided for at different audio sound levels.

The audio sound level of a person speaking in a broadcasting studio is quite different from the audio sound level of a symphony orchestra. The level of transmission as indicated by the depth of modulation of the carrier wave radiated by the broadcasting station, however, does not follow directly in proportion thereto. Radio station operators "ride the gain control" so as to keep the transmitted variations produced by the sound level within a certain range. When such signals are received by the radio receiver, no corresponding expansion or compression is provided. Furthermore, the reproduction usually is at a quite different level from the level of sound of the original source. According to the authority Fletcher, a change of the sound level of the reproduced sound, when compared with the original or normal level of sound from the source, produces on the listener an effect of an apparent change in tonal characteristic.

It, of course, is well known that individuals commonly set the volume control of a radio receiver at a particular value and then adjust the tone control in order to make the reproduction more pleasing and natural. The tone control provided by the average radio receiver, however, is incapable of providing sufficient compensation to overcome the apparent change in tonal characteristic, referred to by Fletcher. Even if a tone control were provided which could produce sufficient compensation, the individual would encounter some difficulty in setting the tone control at the desired point depending upon the type of program being reproduced and the volume level desired for a particular occasion.

It, therefore, is apparent that it would be desirable to provide an improved tone and volume control which could be adjusted in predetermined steps by a push button arrangement to provide the desired tone characteristic and the compensation required for any volume level of reproduction. Where no change in tonal characteristic is desired, so as to obtain a uniform reproduction, the predetermined steps of change of volume level are so compensated as to minimize the change in tonal characteris.ic observed by the authority Fletcher.

In accordance with the present invention, an arrangement is provided whereby an adequate number of steps in volume change are provided by means of a push button arrangement. For those wishing certain control of the tone of reproduction, a push button arrangement is provided where again a predetermined performance characteristic can be obtained repeatedly whenever desired.

It is, therefore, an object of the present invention to provide an improved wide range tone control for sound reproducing circuits which is operated by push buttons.

Another object of the present invention is to provide a push button tone control which maintains the output level constant independent of the volume control setting.

Still another object of the present invention is to provide a push button volume control for compensation at the receiver for variations in audio sound level.

Other and further objects of the present invention subsequently will become apparent by reference to the following description taken in conjunction with the accompanying drawings wherein.

Figure 7:
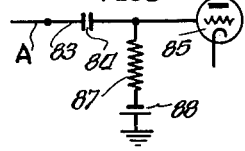
Figure 8:
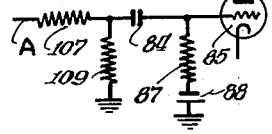
Figure 9:
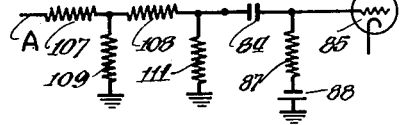

Figures 3, 4, 5, and 6 are circuit diagrams illustrating the circuit arrangements provided when certain push buttons are actuated in the volume control bank;

Figures 7, 8, and 9 are circuit diagrams illustrating the intermediate volume control connections provided for any of the major volume control steps;

Figures 10, 11, 12, and 13 are circuit diagrams illustrating the equivalent circuits provided by actuation of the major tone control push buttons; and Figures 14, 15, 16, and 17 are graphical representations illustrating the reproduction characteristics obtained for different settings of volume and tone control.

Figure 1:
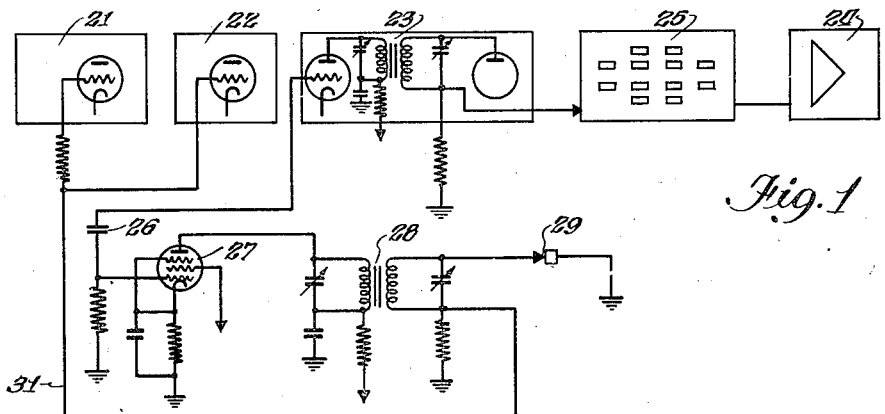
Figure 1 is a block diagram illustrating the application of the present invention to a radio receiver.

The block diagram of Figure 1 shows the application of the present invention to a radio receiver of the superheterodyne type having a radio frequency amplifier 21, a mixer oscillator 22, an intermediate frequency amplifier 23 and an audio amplifier 24. Interposed between the second detector and the audio frequency amplifier 24 is a push button controlled circuit 25. In order to provide an optimum operation in accordance with the present invention, it is preferable to provide an improved or amplified automatic gain control which is represented by the circuit diagram illustrated in Figure 1. A certain amount of energy is obtained from one of the tubes of the intermediate frequency amplifier 23 by a coupling capacitor 26 connected to the grid of an amplifying tube 27. This tube functions in the same manner as the parallel tube in the intermediate frequency amplifier, and hence, is connected to an intermediate frequency transformer 28. The output of the transformer is connected to a rectifier 29 which preferably is a Germanium crystal. The voltage developed by virtue of the crystal 29 is fed by means of a conductor 31 to the radio frequency amplifier and the mixer oscillator to produce the desired amplification characteristic. It will be noted that the push button control 25 is provided with 12 push buttons; 6 being for the control of the volume, and 6 being for the control of the tone. The manner in which these push buttons control certain circuits is illustrated by the circuit diagram of Figure 2.

Four push buttons 32, 33, 34 and 35 provide 4 major changes in the volume level, and for convenience, these have been labeled Very Loud, Loud, Medium and Soft respectively. These switches are so arranged that when any one of the switches 32 to 35 is pressed, it releases the previously actuated switch. This type of switch construction is well known and old in the art, and a switch suitable for this purpose is manufactured by the Oak Manufacturing Company of Chicago.

The first switch 32 for the very loud volume is provided with 3 switch blades, 36, 37 and 38 whereas the remaining volume push buttons are each provided with 2 switch blades. Thus, the Loud push button actuates switch blades 39 and 41; the Medium push button, switch blades 42 and 43; and the Soft push button, switch blades 44 and 45. All of the switch blades in the circuit diagram are shown in a position prior to the actuation of any one of them, although subsequently it will become apparent that the same effect is obtained when the Medium push button has been actuated. Actuation of the various push buttons 32 to 35 controls a total variation in volume level of about 70 db, so that the four major steps are spaced about 18 db apart. In order to provide a finer control of the volume, 2 additional push buttons 47 and 48 are provided which are labeled Plus and Minus. Push button 47 has 2 movable switch blades 49 and 51 whereas push button 48 likewise has 2 movable switch blades 52 and 53. Thus, for actuation of any particular one of the push buttons 32 to 35, actuation of the push button 47 will increase the volume level by about 6 db. Actuation of the push button 48 will decrease the volume level predetermined by any of the push buttons 32 to 35 by 6 db. When, however, the Soft push button 35 has been actuated, actuation of the Minus button 48 will reduce the volume level to 0.

The push buttons 47 and 48 are so arranged that the actuation of any one of the major push buttons 32 to 35 produces a release of these buttons, but the actuation of either push button 47 or 48 does not affect the position or condition of any of the push buttons 32 to 35.

Four major tonal change push buttons 54, 55, 56 and 57 are provided, which for convenience, have been labeled Speech, Song, Swing and Symphony. Each of these push buttons has 3 movable switch blades, and hence, push button 54 will actuate switch blades 58, 59 and 61; push button 55 will actuate switch blades 62, 63 and 64; push button 56 will actuate switch blades 65, 66 and 67; and push button 57 will actuate switch blades 68, 69 and 71. Two additional push buttons, each having a single switch blade are provided, and these are labeled High Fidelity and Normal Fidelity. The push button 72 labeled Normal Fidelity has a single switch blade 73, which closes a circuit between ground and an intermediate point in the audio frequency amplifier. The High Fidelity push button 74 has a single switch blade 75 which, however, does not produce any circuit changes in itself, but as soon as all of the push buttons 54 to 57, 72 and 74 are so arranged that actuation of any push button releases all of the remaining or previously actuated buttons, the push button 74 does produce a circuit change.

A conductor 76 is connected to receive audio frequency from a suitable source, such as the detector of the radio receiver diagrammatically shown in Figure 1, or from a phonograph pickup or other source. The conductor 76 is connected through a coupling capacitor 77 to a voltage divider formed of a plurality of resistors 78, 79, 81 and 82. The resistor 82 is connected to a conductor A which leads to the Plus and Minus push buttons 47 and 48 from which a conductor 83 leads to a coupling capacitor 84 which is connected to the grid of an amplifier tube 85. The output of the amplifier tube 85 is connected to the grid of a succeeding amplifier tube 86. Preferably the amplifier tube 85 is a pentode so as to provide the desired gain which has in its grid circuit a grid resistor 87 and a bias cell 88. Suitable screen grid potential is provided through a resistor 89 which is by-passed to the cathode by the capacitor 91. The anode circuit of the tube 85 includes an anode resistor 92 which is connected to a suitable source of potential. An r. f. by-pass capacitor 93 is connected between ground and the anode of the vacuum tube 85. The anode of the vacuum tube 85 is coupled by a capacitor 94 to the grid of the succeeding vacuum tube 86 which has a grid circuit resistor 95. Connected to the anode of the vacuum tube 85 is another by-pass capacitor 96 which is connected to one of the contacts of the normal switch 72 which has its other contact connected to ground. It, therefore, will be noted that the amount of by-pass capacitance provided for the anode of vacuum tube 85 may be controlled by the switch 72. The push button 32 normally has a switch blade 36 arranged to complete a circuit from conductor 97 connected to the juncture of resistors 81 and 82 to conductor 98 which is connected to one terminal of the push button 33. The push button 33 in normal position has its switch blade 39 connected to the conductor 98 with a circuit including a capacitor 99 and a resistor 101 connected to ground. The switch blade 37 of the push button 32 normally is in open circuit position but when actuated will complete a circuit between conductors 102 and 103 which respectively are connected to the junctures of resistors 79 and 81 and resistors 78 and 79. The conductor 103 is also connected to one terminal of push buttons 55, 56 and 57. The switch blade 38 of the push button 32 normally interconnects a conductor lead to the conductor A which is connected to the outer terminal of the resistor 82 and a conductor C which is connected to one terminal of each of the push buttons 54, 55, 56 and 57. When the switch blade 38 is actuated, the conductors 97 and A are connected together so as to provide a short circuit or shunt across the resistor 82.

The switch blade 39, with the push button 33 in normal position, completes a circuit between the conductor 98 and the coupling capacitor 99 and the resistor 101 which is connected to ground. The switch blade 41 of the push button 33 is normally in open circuit position and when actuated short circuits the resistor 82.

Figure 2:
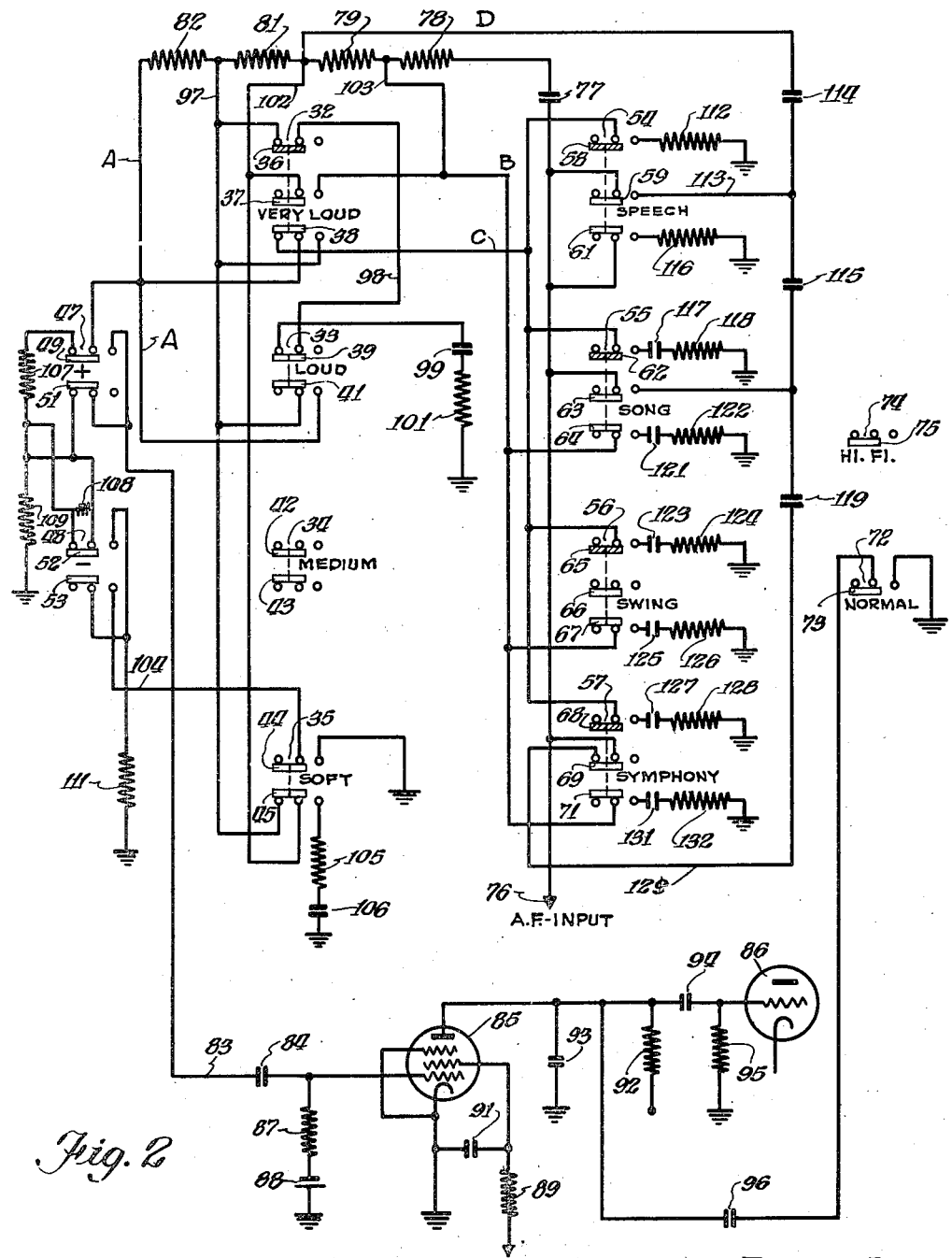
Figure 2 is a circuit diagram illustrating the details of a push button volume and tone control.
Figure 3:
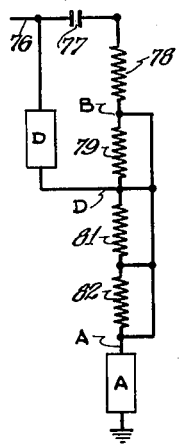
Figure 4:
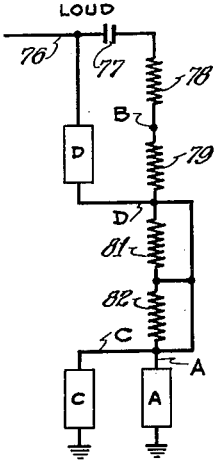

The switch blades 42 and 43 of the push button 34 do not of themselves complete any additional circuits, but the actuation of this push button releases any previously actuated push button thereby to change the circuit to the position shown in solid lines in Figure 2.

The switch blade 44 of the push button 35 is in normal open circuit position, but when actuated connects the ground conductor to a conductor 104 which is connected to one terminal of the push button 48 associated with the switch blade 53. The switch blade 45 of the push button 35 is in normal closed circuit position so as to interconnect the conductors 102 and 97 which short circuit or shunt the resistor 81. The switch blade 45 when actuated connects the conductor 102 to ground through a resistor 105 and a capacitor 106 so that this circuit is connected to the juncture of resistors 79 and 81. Reference may be made to Figures 3, 4, 5 and 6 which show the various circuit arrangements provided upon actuation of the different push buttons 32, 33, 34 and 35. It will be recalled that conductor A goes to the push buttons 47 and 48 which provide the intermediate level steps, and hence, in these figures this portion of the circuit has been represented by the rectangle A. The conductor D from the juncture of the resistors 79 and 81 is connected to a plurality of series arranged capacitors normally connected through switch blade 69 of the tone control push button 57 to the conductor 76, and hence, this circuit combination has been shown by a rectangle D, on the assumption that for purposes of illustration the High Fidelity button 74 has been actuated. It thus becomes apparent that for the Medium position the juncture between the resistors 81 and 82 is connected to ground through coupling capacitor 99 and load resistor 101. In the Soft position the juncture between the resistors 81 and 82 likewise has this same circuit arrangement, and in addition, the juncture between the resistors 79 and 81 is connected to ground through the capacitor 105 and the resistor 106. The manner in which compensation is introduced for the different volume levels in order to provide the proper tonal characteristic subsequently will become apparent by reference to the performance curves shown in Figures 14 to 17.

The conductor A which leads to the Plus and Minus switches normally is connected to the switch blade 49 of the push button 47 to resistor 107 which is connected to resistor 108 which in turn is connected to resistor 109 having one terminal grounded. The switch blade 52 of the push button 48 normally short circuits resistor 108. The juncture between the resistors 108 and 109 is connected to one terminal normally closed by the switch blade 51 of the push button 47 having its other terminal connected to the conductor 83. Actuation of the push button 47, therefore, in effect connects the conductor A directly to the conductor 83. The push button 48 when actuated causes the switch blade 52 to open the shunt across the resistor 108 and to connect the juncture between the resistors 108 and 109 to one terminal of the grounded resistor 111 so that this resistor is in parallel with resistor 109. The switch blade 53 of the push button 48 when actuated connects one terminal of the resistor 111 to the conductor 104 which is connected to one terminal of the normally open circuit connection of the switch blade 44 of the push button 35.

Reference will now be had to Figures 7, 8 and 9 which illustrate the circuit arrangements provided by actuation of the push buttons 47 and 48. Figure 7 shows that the conductor A is connected directly to the conductor 83 so as to provide maximum energy transfer to the vacuum tube 85 from the voltage divider comprising the resistors 78, 79, 81 and 82, when button 47 is actuated. When neither of buttons 47 and 48 is actuated, the circuit arrangement is that shown in Figure 8, which shows that the resistors 107 and 109 are effective. When the Minus button 48 has been actuated, the circuit arrangement is that shown in Figure 9 showing that in addition to the resistors 107 and 109, resistors 108 and 111 are connected in circuit.

The switch blade 58 in normal position is in open circuit relation and when actuated, connects a grounded resistor 112 to the conductor C. The switch blade 59 which normally is in open circuit condition, when actuated, connects the conductor 76 to conductor 113 which is connected to the juncture of capacitors 114 and 115. Capacitor 114 is connected to conductor D which in effect, therefore, connects the capacitor 114 to the juncture of resistors 79 and 81. The switch blade 61 of the push button 54 also is in normal open circuit position and when actuated connects a grounded resistor 116 to conductor 76.

The switch blade 62 of the push button 55, when actuated, connects the conductor C to a circuit including a capacitor 117 and a grounded resistor 118. The switch blade 63 when actuated interconnects the conductor 76 with the juncture between capacitors 115 and 119 so that the capacitors 114 and 115 are connected in series between the juncture of the resistors 79 and 81 and the conductor 76. The switch blade 64 of the push button 55 connects the conductor B from the juncture of the resistor 78 and 79 to a circuit including a capacitor 121 and a grounded resistor 122.

The switch blade 65 of the push button 56 interconnects the conductor C with a circuit including a capacitor 123 and a grounded resistor 124. The switch blade 67 of the button 56 when actuated interconnects the conductor B from the juncture of resistor 78 and 79 to a circuit including a capacitor 125 and a grounded resistor 126.

The switch blade 68 of the push button 57 when actuated interconnects the conductor C with a circuit including a capacitor 127 and a resistor 128 which is grounded. The switch blade 69 which is normally in closed circuit relation between the conductor 76 and a conductor 129 leading to the series capacitors 119, 115 and 114 is opened when actuated. The switch blade 71 of the push button 57 when actuated completes a circuit between the conductor B and a circuit including a capacitor 131 and a grounded resistor 132.

Figure 10:
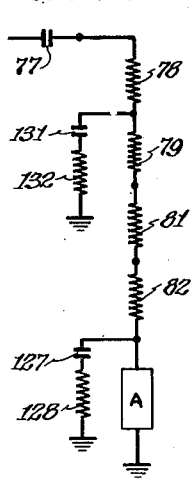

Figure 10 illustrates the circuit arrangement provided when the Symphony button 57 has been actuated whereby the switch blade 71 connects a shunt circuit comprising the capacitor 131 and the resistor 132 between ground and the juncture of the resistor 78 and 79. Assuming then the Medium button 34 of the volume control has been actuated, the switch blade 68 of the push button 57 connects the circuit comprising the resistor 128 and the capacitor 127 to the conductor A or the end terminal of the resistor 82.

Figure 11:
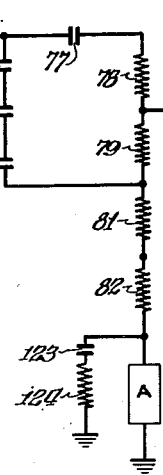

Figure 11 shows the arrangement obtained when push button 56 is actuated. Since the switch blade 69 of the push button 57 interconnects the conductor 76 with the series capacitors 119, 115 and 114, this circuit is in effect between the conductor 76 and the juncture of the resistors 79 and 81. The switch blade 67 has connected a shunt circuit 125, 126 between ground and the juncture of the resistors 78 and 79. The switch blade 65 has connected a shunt circuit 123, 124 between ground and the end terminal of the resistor 82.

Figure 12:
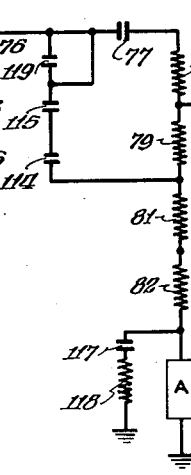

Figure 12 shows that different shunt circuits for "Song" have been provided between ground and the resistor 78 and 79 and between ground and the end terminal of the resistor 82. It will also be noted that between the conductor 76 and the juncture of resistor 79 and 81, two capacitors 114 and 115 are connected in series.

Figure 13:
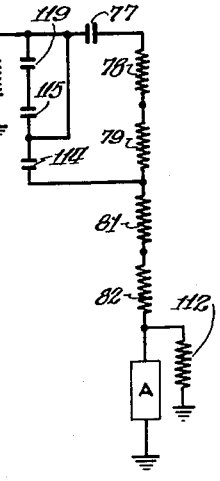

In the Speech position, Figure 13, upon actuation of push button 54, a resistor 116 is connected between the conductor 76 and ground and a capacitor 114 is connected between the conductor 76 and the common juncture of resistor 79 and 81. From the juncture of resistor 82 with conductor A, there is provided a shunt circuit, including the resistor 112 connected to ground.

In order to further assist those skilled in the art to follow the teachings of the present invention, typical values of the components employed in Figure 2 are as follows:

Resistor:
- 111—0.47 meg.
- 109—1.0 meg.
- 108—0.22 meg.
- 107—0.47 meg.
- 82—1.0 meg.
- 81—1.0 meg.
- 79—1.0 meg.
- 78—1.0 meg.
- 101—0.15 meg.
- 106—0.10 meg.
- 112—0.068 meg.
- 116—0.47 meg.
- 118—0.18 meg.
- 122—0.47 meg.
- 124—0.15 meg.
- 126—0.47 meg.
- 128—0.10 meg.
- 132—0.33 meg.

Capacitor:
- 86—680 mmfd.
- 84—0.1 mfd.
- 72—0.022 mfd.
- 119—39 mmfd.
- 115—56 mmfd.
- 114—150 mmfd.
- 117—0.01 mfd.
- 121—0.0022 μfd.
- 123—0.005 μfd.
- 125—0.0001 μfd.
- 127—0.0047 μfd.
- 131—0.001 μfd.
- 99—0.0033 μfd.
- 106—0.002 μfd.

Figure 14:
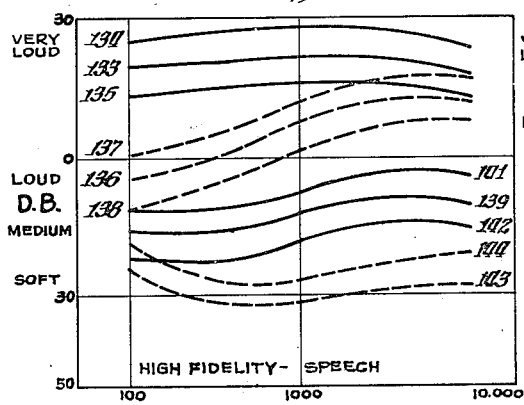

Figure 14 graphically illustrates the changes which occur when the various push buttons in the volume control are actuated, when it is assumed that the High Fidelity push button 74 and the speech button 54 have been actuated for the tone control. The curve 133 shows the reproduction characteristic when push button 32 has been actuated. If now, in addition to this, push button 47 is actuated, the curve 134 illustrates the characteristic reproduction. If push buttons 32 and 48 are actuated, the curve 135 illustrates the reproduction. The curve 136 shows the reproduction characteristic when the push button 33 has been actuated. When the push button 47 is actuated, the curve 137 illustrates the increased volume. When the push button 48 is actuated along with the push button 33, the curve 138 illustrates the decreased volume for this setting. When the Medium button 34 is actuated the reproduction is illustrated by the curve 139. This may be increased by the actuation of button 47 as illustrated by curve 141. From the Medium volume the level may be decreased by actuating push button 48 as illustrated by curve 142. When the Soft button 35 is actuated the reproduction is in accordance with curve 143. When push button 47 is actuated for increasing volume slightly, the curve 144 illustrates the reproduction. When the Soft button 35 and the push button 48 are actuated, the volume drops to 0.

Figure 15:
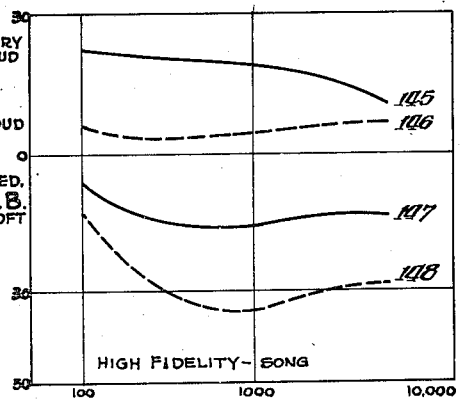

The curves 145, 146, 147 and 148 of Figure 15 illustrate the reproduction characteristic when the High Fidelity button 74 and the Song button 55 have been actuated, and the various buttons Very Loud, Loud, Medium and Soft are actuated in succession. Thus, the curve 145 shows the output when push buttons 32, 55 and 74 have been actuated.

Figure 16:
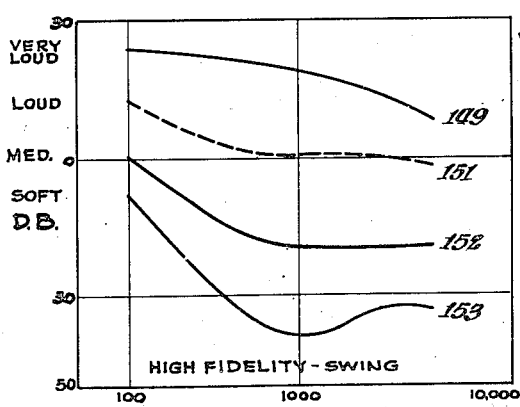

Assuming that push buttons 56 and 74 have been actuated, successive actuation of the push buttons 32, 33, 34 and 35 will produce output characteristics illustrated by curves 149, 151, 152 and 153 as shown in Figure 16.

Figure 17:
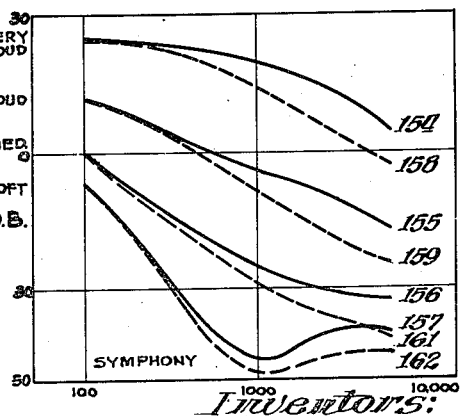

Assuming that push buttons 57 and 74 of the tone control have been actuated, successive actuation of push buttons 32, 33, 34 and 35 will produce output curves corresponding to curves 154, 155, 156 and 157. If, in actuation of any of the several buttons 32 to 35, push buttons 72 and 57 have been actuated, the output curves would be represented by the curves 158, 159, 161 and 162. It, of course, will be appreciated by those skilled in the art that the changes indicated between the set of curves 154 to 157 and the curves 158, 159, 161 and 162 can be made in any of the preceding characteristic curves shown in Figures 14, 15 and 16. Therefore, Figure 14 in a general way, illustrates the effects produced by actuation of push buttons 47 and 48 and the curve in Figure 17 illustrates the effect produced by actuation of the different push buttons 72 and 74.

Figure 5:
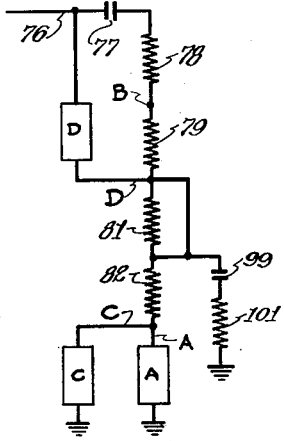
Figure 6:
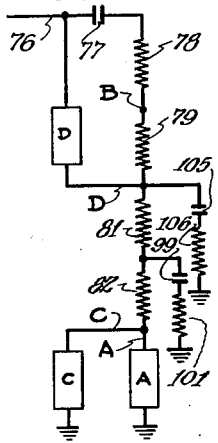

From the foregoing, it will be appreciated that in actuating push buttons 57, 56, 55 and 54 in that order, the low frequency response is reduced and the high frequency response is increased. The actuation of the High Fidelity push button 74 increases the high frequency response. It will also be observed that the least compensation is provided for the very loud reproduction when push button 32 has been actuated. At other volume levels compensation is introduced for the purpose previously mentioned. Thus, for the Loud position one compensation circuit is produced by the connection of conductor D between the input and an intermediate point on the voltage divider. For the Medium position an additional compensation circuit is produced as shown in Figure 5, whereas for the Soft position still another compensation circuit is introduced as shown in Figure 6. The effects of these compensation arrangements are believed to be amply apparent by an examination of the output characteristics as illustrated by the curves in Figures 14 to 17. In general, these compensation networks have been designed so as to give approximately the same volume level for each tone position. The compensations provided for any selected tone position are introduced upon actuation of any volume push button so as to minimize the apparent change observed by Fletcher.

While for the purpose of illustrating and describing the present invention a preferred embodiment has been shown in the drawings, it is to be understood that numerous variations thereof are contemplated and that for different installations or uses certain variations in the components and in their arrangements are contemplated, all as may be commensurate with the spirit and scope of the invention as defined in the accompanying claims.

We claim:

1. A volume control comprising a plurality of push button switches, a pair of audio input terminals, an impedance network, a plurality of resistors each connected in series and all connected in series with said impedance network across said audio input terminals, said impedance network having a pair of audio output terminals, a plurality of acoustic compensating circuits for selective coupling to said resistors, said compensating circuits each having a different frequency response characteristic, said switches being arranged to couple selected compensating circuits across certain of said resistors when attenuation occurs between said input and output circuits, and to short circuit certain of said resistors for minimum attenuation between said input and output circuits, said switches being arranged to produce equal changes in volume level when actuated in progression, and means included in said impedance network and connected in series with said resistors for increasing or decreasing by equal amounts the volume level as determined by the actuation of any previously selected switch.

2. A volume control comprising a plurality of push button switches of the type where the actuation of one switch releases the previously actuated switch, an attenuation circuit comprising a plurality of resistors connected in series between audio input and output circuits, a plurality of shunt circuits for selective connection to said resistors, said shunt circuits each having a different frequency response characteristic, said switches being connected to said resistors and said shunt circuits to render effective certain shunt circuits for certain attenuation values and to shunt certain of said resistors for minimum attenuation, said switches being arranged to produce equal changes in volume when actuated in progression, and push button controlled means connected in series with said resistors for increasing or decreasing by equal amounts the volume level as determined by the actuation of any selected one of said first switches, said latter push button controlled means being arranged to be restored to original condition upon the subsequent actuation of one of said first mentioned push button switches.

3. A volume control system comprising a plurality of push button switches of the type wherein only one button is effective at a time, a plurality of resistors connected to said switches and in series between audio input and output circuits to produce equal volume level changes when said switches are actuated in progression, said switches being arranged to shunt different resistors and to introduce different tone compensating circuits to minimize apparent tonal change when volume level is reduced, and push button controlled means connected in series with said resistors for increasing or decreasing by equal amounts the volume level as determined by the actuation of any selected switch thereby to provide intermediate levels of volume.

4. A volume control system comprising a plurality of push button switches of the type wherein only one button is effective at a time, a plurality of resistors connected to said switches and in series between audio input and output circuits to produce equal volume level changes when said switches are actuated in progression, said switches being arranged to shunt different resistors and to introduce different tone compensating circuits to minimize apparent tonal change when volume level is reduced, and push button controlled means connected in series with said resistors for increasing or decreasing by equal amounts the volume level as determined by the actuation of any selected switch thereby to provide intermediate levels of volume, said latter push button controlled means being arranged to restore to original condition upon the subsequent actuation of any one of the said first mentioned push button switches.

5. A combination volume and tone control system comprising two sets of push button switches wherein only one button in each set is effective at a time, a pair of audio input terminals, an impedance network, a plurality of resistors each connected in series and all connected in series with said impedance network across said audio input terminals, said impedance network having a pair of audio output terminals, a plurality of compensating circuits having different non-uniform frequency characteristics, circuit connections between certain of said circuits, one set of said switches being operative to short circuit certain of said resistors for progressively increasing in equal steps the output volume level, and means including a pair of push button switches and circuit elements controlled by the last mentioned switches and included in said impedance network for producing intermediate volume level changes.

6. A volume control comprising a plurality of push button switches, a pair of audio input terminals, an impedance network, a plurality of resistors each connected in series and all connected in series with said impedance network across said audio input terminals, said impedance network having a pair of audio output terminals, a plurality of acoustic compensating circuits for selective coupling to said resistors, said compensating circuits each having a different frequency response characteristic, said switches being arranged to couple selected compensating circuits across certain of said resistors when attenuation occurs between said input and output circuits, and to short circuit certain of said resistors for minimum attenuation between said input and output circuits, said switches being arranged to produce similar changes in volume level when actuated in progression, and means included in said impedance network and connected in series with said resistors for increasing or decreasing by like amounts the volume level as determined by the actuation of any previously selected switch.

7. A push-button-actuated combined tone and volume control device comprising a first resistor, a second resistor, a third resistor, a fourth resistor, and a tone-determining impedance network connected in series and adapted to be coupled across a source of audio frequency signals, the terminals of said impedance network providing an audio output circuit, a volume controller comprising four depressible buttons, means for assuring the release of the other buttons when any one of said buttons is depressed, switching means responsive to the depression of a first one of said buttons (designated "Very Loud") for short-circuiting the second and fourth of said resistors, switching means responsive to the depression of a second one of said buttons (designated "Loud") for short-circuiting the fourth of said resistors, switching means normally short-circuiting the third one of said resistors, a third one of said buttons (designated "Medium") being operative solely to release the other buttons, the last-mentioned switching means being responsive to the depression of the fourth one of said push buttons (designated "Soft") for removing the short circuit on said third resistor.

8. A device in accordance with claim 7, a resistance-capacitance compensating network, and switching means normally connecting said resistance-capacitance network across said fourth resistor and said impedance, the last-named switching means being responsive to depression of the first one of said buttons (designated "Very Loud") or the second one of said buttons (designated "Loud") to disconnect said compensating network from the junction of said second and third resistors.

9. A device in accordance with claim 8, another resistance-capacitance compensating network, and switching means responsive to depression of the fourth one of said buttons (designated "Soft") to connect said other compensating network across said third and fourth resistors and said impedance.

10. In a device in accordance with claim 7, a tone controller including a second set of four push buttons so arranged that depression of one causes release of the other three, an input capacitor connected to the high-potential terminal of said first resistance, three capacitors in series, switching means normally connecting said capacitors across said first and second resistors and said input capacitor, said switching means being responsive to depression of a first one of said push buttons (designated "Symphony") to disconnect said three-capacitor circuit from said input capacitor, a second one of said push buttons (designated "Swing") not disturbing that connection, switching means responsive to depression of a third one of said push buttons (designated "Song") to short circuit one of said three capacitors, and switching means responsive to depression of a fourth one of said push buttons (designated "Speech") to short circuit two of said three capacitors.

11. A device in accordance with claim 10, three independent resistance-capacitor compensating networks, and a plurality of switching means responsive respectively to depression of the first ("Symphony"), second ("Swing"), and third ("Song") push buttons to connect to a selected one of said networks across the second, third, and fourth resistors and said impedance network.

12. A device in accordance with claim 11, a resistor compensating network, and switching means responsive to depression of the fourth ("Speech") push button to connect said resistor compensating network across the input of the device.

13. A device in accordance with claim 12, three other independent resistance-capacitance compensating networks, another resistor compensating network, and a plurality of switching means responsive respectively to depression of the first ("Symphony"), second ("Swing"), third ("Song"), and fourth ("Speech") push buttons to include a selected one of said other compensating networks in said impedance network.

14. A device in accordance with claim 13, and a fifth push button (designated "High Fidelity") included in said tone controller for releasing all of the first four push buttons of said controller.

15. A device in accordance with claim 14, an amplifier coupled to said audio output circuit, a shunt capacitor, a sixth independent push button (designated "Normal"), and switching means responsive to depression of said sixth push button to encircuit said shunt capacitor with said amplifier.

16. A device in accordance with claim 7 in which the impedance network comprises a first series capacitor-shunt resistor filter section, fifth and sixth push buttons in the volume controller (designated "+" and "—"), a second series resistor-shunt resistor filter section, a third series resistor-shunt resistor filter section, switching means normally connecting the second filter section in cascade with and ahead of the first, said switching means being responsive to the depression of the fifth of said push buttons (designated "+") to remove the second filter from said impedance network, and switching means responsive to the depression of the sixth of said push buttons (designated "—") for interposing the third section between the first and second filter sections, each of said fifth and sixth push buttons having no effect on the first four but being released by depression of any one of said four.

17. In a push-button actuated combined tone and volume control device, four resistors and an impedance network connected in series and adapted to be coupled across a source of audio frequency signals, the terminals of said impedance providing an audio output circuit, a tone controller including a set of four push buttons so arranged that depression of one causes release of the other three, an input capacitor connected to the high-potential terminal of the first resistor, three capacitors in series, switching means normally connecting said capacitors across the first and second resistors and said input capacitor, said switching means being responsive to depression of a first one of said push buttons (designated "Symphony") to disconnect said three-capacitor circuit from said input capacitor, a second one of said push buttons (designated "Swing") not disturbing that connection, switching means responsive to depression of a third one of said push buttons (designated "Song") to short circuit one of said three capacitors, and switching means responsive to depression of a fourth one of said push buttons (designated "Speech") to short-circuit two of said three capacitors.

18. A device in accordance with claim 17, three independent resistance-capacitor compensating networks, and a plurality of switching means responsive respectively to depression of the first ("Symphony"), second ("Swing"), and third ("Song") push buttons to connect to a selected one of said networks across the second, third, and fourth resistances and said impedance.

19. A device in accordance with claim 18, a resistor compensating network, and switching means responsive to depression of the fourth ("Speech") push button to connect said resistor compensating network across the input of the device.

20. A device in accordance with claim 19, three other independent resistance-capacitance compensating networks, another resistor compensating network, and a plurality of switching means responsive respectively to depression of the first ("Symphony"), second ("Swing"), third ("Song"), and fourth ("Speech") push buttons to include a selected one of said other compensating networks in said impedance.

21. A device in accordance with claim 20, and a fifth push button (designated "High Fidelity") included in said tone controller for releasing all of the first four push buttons of said controller.

22. A device in accordance with claim 21, an amplifier coupled to said audio output circuit, a shunt capacitor, a sixth push button (designated "Normal"), and switching means responsive to depression of said sixth push button to shunt encircuit said capacitor with said amplifier.

23. A device in accordance with claim 17 in which the impedance network comprises a first series capacitor-shunt resistor filter section, a pair of push buttons in the volume controller (designated "+" and "—"), a second series resistor-shunt resistor filter section, a third series resistor-shunt resistor filter section, switching means normally connecting the second filter section in cascade with and ahead of the first, said switching means being responsive to the depression of one of said push buttons (designated "+") to remove the second filter section from said impedance network, and switching means responsive to the depression of the other of said push buttons (designated "—") for interposing the third section between the first and second filter sections.

PAUL F. G. HOLST.
MORTON J. NELSON.

REFERENCES CITED

The following references are of record in the file of this patent:

UNITED STATES PATENTS

| Number | Name | Date |
|---|---|---|
| 1,864,527 | Castner | June 28, 1932 |
| 2,101,832 | Barton | Dec. 14, 1937 |
| 2,511,924 | Lee | June 20, 1950 |

FOREIGN PATENTS

| Number | Country | Date |
|---|---|---|
| 394,712 | Great Britain | July 3, 1933 |